(12) United States Patent
Lor et al.

(10) Patent No.: US 8,089,697 B2
(45) Date of Patent: Jan. 3, 2012

(54) PRISMATIC LAMINATE AND METHOD FOR MAKING THE SAME

(75) Inventors: Whey-Bin Lor, Jhubei (TW); Kuang-Lin Yuan, Taichung (TW); Ru-Ping Huang, Toufen Township, Miaoli County (TW); Chia-Chu Lin, Dongshan Township, Yilan County (TW); Tsung-Sung Tsai, Zhongli (TW); Ming-Hsiang Lee, Hsinchu (TW); Ching-Hung Lin, Hemei Township, Changhua County (TW); Ming-Cheng Shih, Dacun Township, Changhua County (TW)

(73) Assignee: Optivision Technology Inc., Hsinchu (TW)

( * ) Notice: Subject to any disclaimer, the term of this patent is extended or adjusted under 35 U.S.C. 154(b) by 65 days.

(21) Appl. No.: 12/652,216

(22) Filed: Jan. 5, 2010

(65) Prior Publication Data

US 2011/0038052 A1 Feb. 17, 2011

(30) Foreign Application Priority Data

Aug. 13, 2009 (TW) .............................. 98127260 A

(51) Int. Cl.
*G02B 27/10* (2006.01)
*F21V 5/02* (2006.01)
*B05D 5/06* (2006.01)

(52) U.S. Cl. ...................... 359/625; 362/339; 427/162

(58) Field of Classification Search .................. 359/599, 359/625, 834; 362/339; 427/162, 595
See application file for complete search history.

(56) References Cited

U.S. PATENT DOCUMENTS

| 6,280,063 B1 * | 8/2001 | Fong et al. .................... 362/333 |
| 2009/0122577 A1 * | 5/2009 | Wu et al. ....................... 362/627 |
| 2011/0068305 A1 * | 3/2011 | Yeh et al. ...................... 252/582 |

* cited by examiner

*Primary Examiner* — David N Spector
(74) *Attorney, Agent, or Firm* — Sunstein Kann Murphy & Timbers LLP

(57) ABSTRACT

A method for making a prismatic laminate includes the steps of: a) forming a back-coating roller having a roller surface with a plurality of recesses arranged in a predetermined pattern and produced by laser holography; b) preparing a prismatic structure including a plate body having a first surface and a second surface opposite to the first surface, and a plurality of prismatic strips formed on the first surface of the plate body; c) applying a coating containing a resin component and an antistatic agent on the second surface of the plate body; and d) embossing the coating with the back-coating roller to form an optical layer including a plurality of microstructures protruding in a direction away from the second surface of the plate body and having a pattern corresponding to that of the recesses in the roller surface.

10 Claims, 5 Drawing Sheets

US 8,089,697 B2

PRISMATIC LAMINATE AND METHOD FOR MAKING THE SAME

CROSS-REFERENCE TO RELATED APPLICATION

This application claims priority of Taiwanese Application No. 098127260, filed on Aug. 13, 2009.

BACKGROUND OF THE INVENTION

1. Field of the Invention

The invention relates to a prismatic laminate, more particularly to a prismatic laminate including an optical layer. The invention also relates to a method for making the prismatic laminate.

2. Description of the Related Art

Referring to FIG. 1, a conventional planar light source device for a liquid crystal display and the like includes a planar light source unit 11 and an optical film unit 12 bonded to the planar light source unit 11. The planar light source unit 11 includes a light guide plate 111, a light source 112, and a reflecting sheet 113. The light guide plate 111 has a light-incident surface 114, a bottom surface 115, and a light-exiting surface 116 opposite to the bottom surface 115. The light source 112 is bonded to the light-incident surface 114. The reflecting sheet 113 is bonded to the bottom surface 115. The optical film unit 12 is disposed on the light-exiting surface 116, and has a prismatic sheet 121, and a top protective diffusion sheet 122 and a bottom diffusion sheet 123 oppositely disposed on the prismatic sheet 121. The prismatic sheet 121 includes a plate body 124 and a plurality of prismatic strips 125 formed on a surface of the plate body 124 distal from the planar light source unit 11. The top protective diffusion sheet 122 is disposed on the prismatic strips 125, and the bottom diffusion sheet 123 is disposed between the prismatic sheet 121 and the light guide plate 111.

The light emitted from the light source 112 enters into the light guide plate 111 via the light-incident surface 114, is guided by the light guide plate 111 and the reflecting sheet 113 so as to exit the light guide plate 111 via the light-exiting surface 116, and travels to the optical film unit 12.

The light reaching the optical film unit 12 from the light guide plate 111 is diffused homogeneously by the bottom diffusion sheet 123, is focused by the prismatic sheet 121, and is further diffused homogeneously by the top protective diffusion sheet 122. Furthermore, the top protective diffusion sheet 122 is used for protecting the prismatic strips 125 from damage during subsequent processing, and for masking defects of the prismatic sheet 121.

In order to simplify the components and the fabrication process for the optical film unit 12, the surface of the prismatic sheet 121 distal from the prismatic strips 125 is usually formed with an optical layer 126 having a diffusion function, as best shown in FIG. 2. There are two types of the optical layer 126, one of which contains a diffusion material and is obtained by blending the diffusion material therein, and the other of which contains no diffusion material and is obtained by forming microstructures 127 having a diffusion function on a surface of the optical layer 126, as shown in FIG. 2. The method for making the prismatic sheet 121 having the optical layer 126 with the microstructures 127 comprises the steps of:

a) processing a surface of a roller by hot-pressing embossment, sand-blasting, or casting to obtain a roller having a roller surface with a plurality of recesses or protrusions in a predetermined pattern;

b) preparing a prismatic structure including a plate body having a first surface and a second surface opposite to the first surface, and a plurality of prismatic strips formed on the first surface of the plate body;

c) applying a coating on the second surface of the plate body; and d) embossing the coating with the roller obtained in the step a) while curing the coating to form the prismatic sheet 121 with the optical layer 126 including a plurality of the microstructures 127.

Since the recesses or protrusions on the roller surface are formed by hot-pressing embossment, sand-blasting, or casting, it is difficult to control the precision of the recesses or protrusions. Therefore, the quality of the microstructures 127 of the optical layer 126 obtained in the step d) cannot be controlled precisely. Furthermore, since the prismatic sheet 121, the top protective diffusion sheet 122, and the bottom diffusion sheet 123 are made of polymeric materials, the quality of the optical film unit 12 may be affected by the optical coupling due to static adsorption produced during the fabrication of the optical film unit 12.

SUMMARY OF THE INVENTION

Therefore, an object of the present invention is to provide a prismatic laminate with an optical layer having improved precision and quality.

Another object of the present invention is to provide a method for making the prismatic laminate.

In one aspect of this invention, a method for making a prismatic laminate includes the steps of: a) forming a back-coating roller having a roller surface with a plurality of recesses arranged in a predetermined pattern and produced by laser holography; b) preparing a prismatic structure including a plate body having a first surface and a second surface opposite to the first surface, and a plurality of prismatic strips formed on the first surface of the plate body; c) applying a coating containing a resin component and an antistatic agent on the second surface of the plate body; and d) embossing the coating with the back-coating roller to form an optical layer including a plurality of microstructures protruding in a direction away from the second surface of the plate body and having a pattern corresponding to that of the recesses in the roller surface.

In another aspect of this invention, a prismatic laminate includes a prismatic structure and an optical layer. The prismatic structure includes a plate body having a first surface and a second surface opposite to the first surface, and a plurality of prismatic strips formed on the first surface of the plate body. The optical layer is formed on the second surface of the plate body, and includes a plurality of microstructures protruding in a direction away from the second surface of the plate body. Each of the microstructures has a protruding height ranging from 0.05 to 0.5 µm. The microstructures are formed via a back-coating roller having a plurality of recesses arranged in a predetermined pattern and produced by laser holography.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
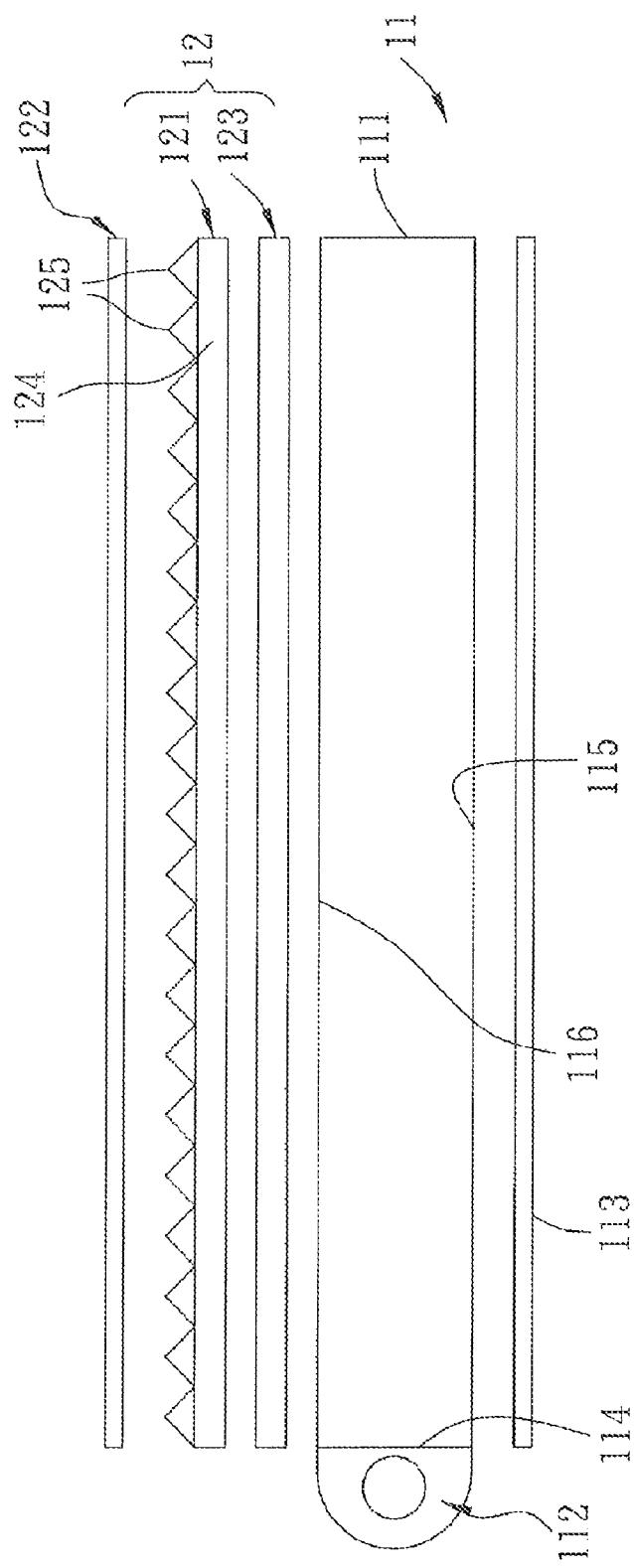
FIG. 1 is an exploded schematic view of a conventional planar light source device.
Figure 2:
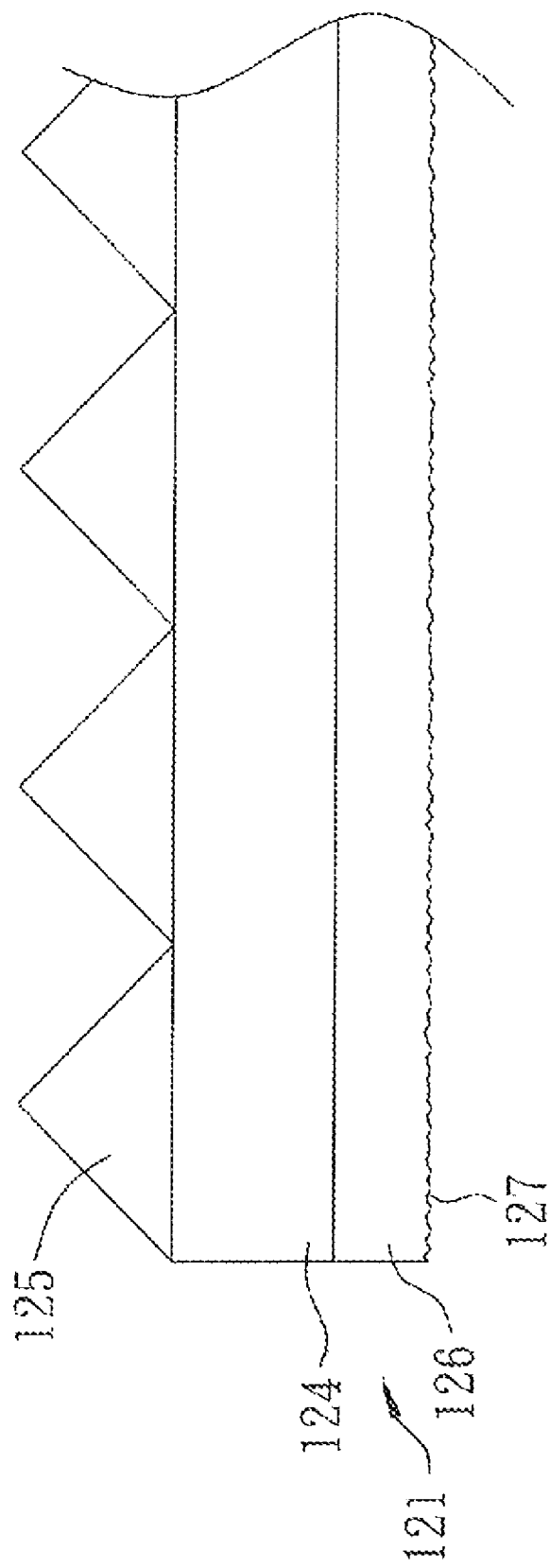
FIG. 2 is a fragmentary schematic view of a conventional prismatic sheet.
Figure 3:
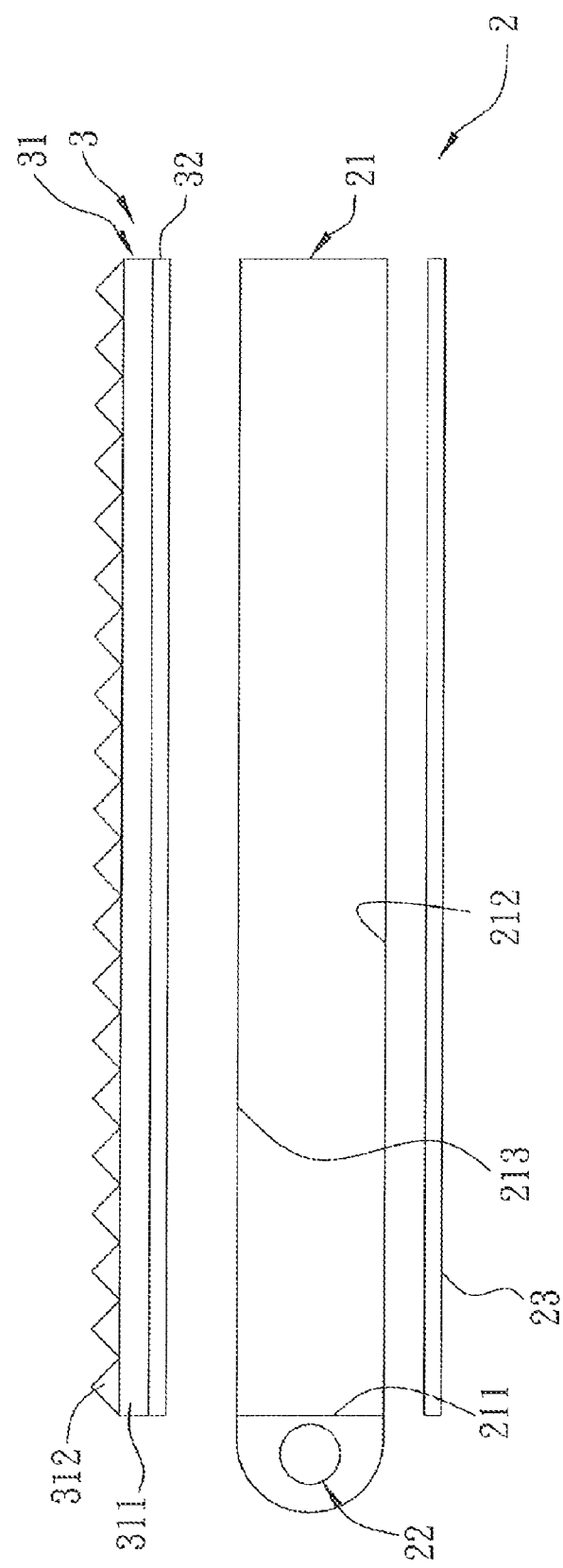
FIG. 3 is an exploded schematic view of a preferred embodiment of a prismatic laminate-according to this invention disposed on a planar light source unit.
Figure 4:
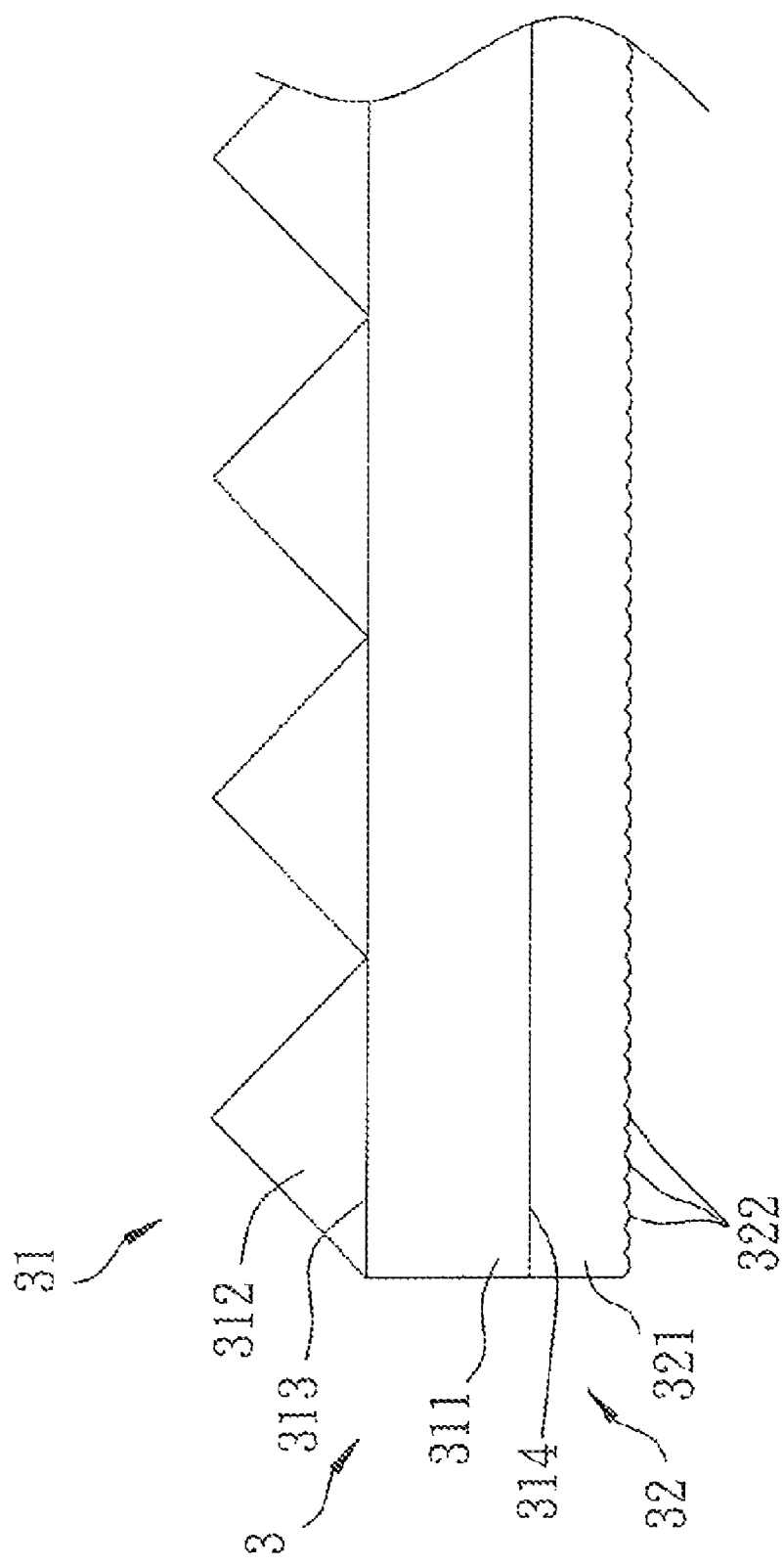
FIG. 4 is a fragmentary schematic view of the preferred embodiment.

Referring to FIGS. 3 and 4, the preferred embodiment of a prismatic laminate 3 according to this invention is shown to be disposed on a planar light source unit 2 for a liquid crystal display and the like.

The planar light source unit 2 includes alight guide plate 21, a light source 22, and a reflecting sheet 23. The light guide plate 21 has a light-incident surface 211, a bottom surface 212, and a light-exiting surface 213 opposite to the bottom surface 212. The light source 22 is bonded to the light-incident surface 211. The reflecting sheet 23 is bonded to the bottom surface 212.

The prismatic laminate 3 is disposed on the light-exiting surface 213, and includes a prismatic structure 31 and an optical layer 32. The prismatic structure 31 includes a plate body 311 having a first surface 313 distal from the planar light source unit 2 and a second surface 314 opposite to the first surface 313, and a plurality of prismatic strips 312 formed on the first surface 313 of the plate body 311.

The plate body 311 and the prismatic strips 312 are independently made of transparent materials. In the preferred embodiment, the plate body 311 is made of polyester, such as polyethylene terephthalate, and the prismatic strips 312 are made of ultra-violet curable resin. Each of the prismatic strips 312 has a triangular cross-section.

The optical layer 32 is formed on the second surface 314 of the plate body 311, and has a thickness ranging from 2 to 30 μm. The optical layer 32 includes a base part 321 bonded to the second surface 314 of the plate body 311, and a plurality of microstructures 322 protruding from the base part 321 in a direction away from the second surface 314 of the plate body 311. Each of the microstructures 322 has a protruding height ranging from 0.05 μm to 0.5 μm.

The light emitted from the light source 22 enters into the light guide plate 21 via the light-incident surface 211, is guided by the light guide plate 21 and the reflecting sheet 23 so as to exit the light guide plate 21 via the light-exiting surface 213, and travels to the prismatic laminate 3. The light reaching the optical layer 32 of the prismatic laminate 3 is diffused via the microstructures 322, travels to the prismatic structure 31, and is refracted by the prismatic strips 312 so as to achieve a purpose of improving a luminance of a display (not shown).

As described above, each of the microstructures 322 preferably has a protruding height ranging from 0.05 μm to 0.5 μm so as to control the haze of the microstructures 322 to be in a range from 5 to 20% while retaining a high transmittance of not less than 85%. If the protruding height is less than 0.05 μm, the haze is unsatisfactory. On the other hand, if the protruding height is more than 0.5 μm, the transmittance is insufficient.

The optical layer 32 is formed from a coating including a transparent resin component and an antistatic agent. The transparent resin component is a thermoplastic resin or an ultra-violet curable resin. Examples of the thermoplastic resin suitable for the present invention include, but are not limited to, polyester, polyamide, polypropylene, polyvinyl chloride, polyethylene methyl methylacrylate, polycarbonate, or combinations thereof. The ultra-violet curable resin can be cross-linked and cured by irradiation of ultra-violet light. The ultra-violet curable resin includes an ultra-violet curable monomer and an ultra-violet curable oligomer, and a photo-initiator. Examples of the ultra-violet curable monomer suitable for the present invention include, but are not limited to, styrenic monomers; acrylates, such as methyl acrylate, methoxy ethyl acrylate, tripropylene glycol diacrylate, dipropylene glycol diacrylate, 2-phenoxy ethyl acrylate, 1,6-hexylene glycol diacrylate, and butyl acrylate; and methacrylates, such as methyl methacrylate, ethyl methacrylate, and methoxy ethyl methacrylate; and combinations thereof. Examples of the photo-initiator suitable for the present invention include, but are riot limited to, acetophenone, benzophenone, acylphosphine oxide, and combinations thereof. In addition, any suitable additives commonly used in the art can be added if desired. For example, a sensitizer can be added to increase photo-sensitivity of the ultra-violet curable resin. Oligomers such as polyester acrylate oligomers, epoxy acrylate oligomers, urethane acrylate oligomers, full acrylate oligomers, or the like can be added to adjust mechanical properties of the ultra-violet curable resin for specific requirements.

Preferably, the transparent resin component for the optical layer 32 is similar to the material for the prismatic structure 31 so as to avoid warping or waving of the optical layer 32 and the prismatic structure 31 due to the difference in the thermal expansion coefficients therebetween. In the preferred embodiment, the transparent resin component includes an ultra-violet curable acrylate resin and benzophenone.

The antistatic agent is used for reducing surface resistance of the optical layer 32 so as to decrease an optical coupling phenomenon and a scratching problem due to static absorption of particles during assembly the prismatic structure 31 to the optical layer 32. It is found that the static absorption can be effectively decreased when the surface resistance of the optical layer 32 is not more than $10^{13} \Omega/\square$. Preferably, the optical layer 32 has a surface resistance ranging from $10^{10}$ to $10^{13} \Omega/\square$, which can be obtained when the antistatic agent is used in an amount ranging from 5 to 25 wt % of the coating for forming the optical layer 32. Examples of the antistatic agent suitable for the present invention include, but are not limited to, metallic conductive particle, metal oxide, a quarternary ammonium salt, or combinations thereof. The antistatic agent used in the preferred embodiment is quarternary ammonium salt.

Figure 5:
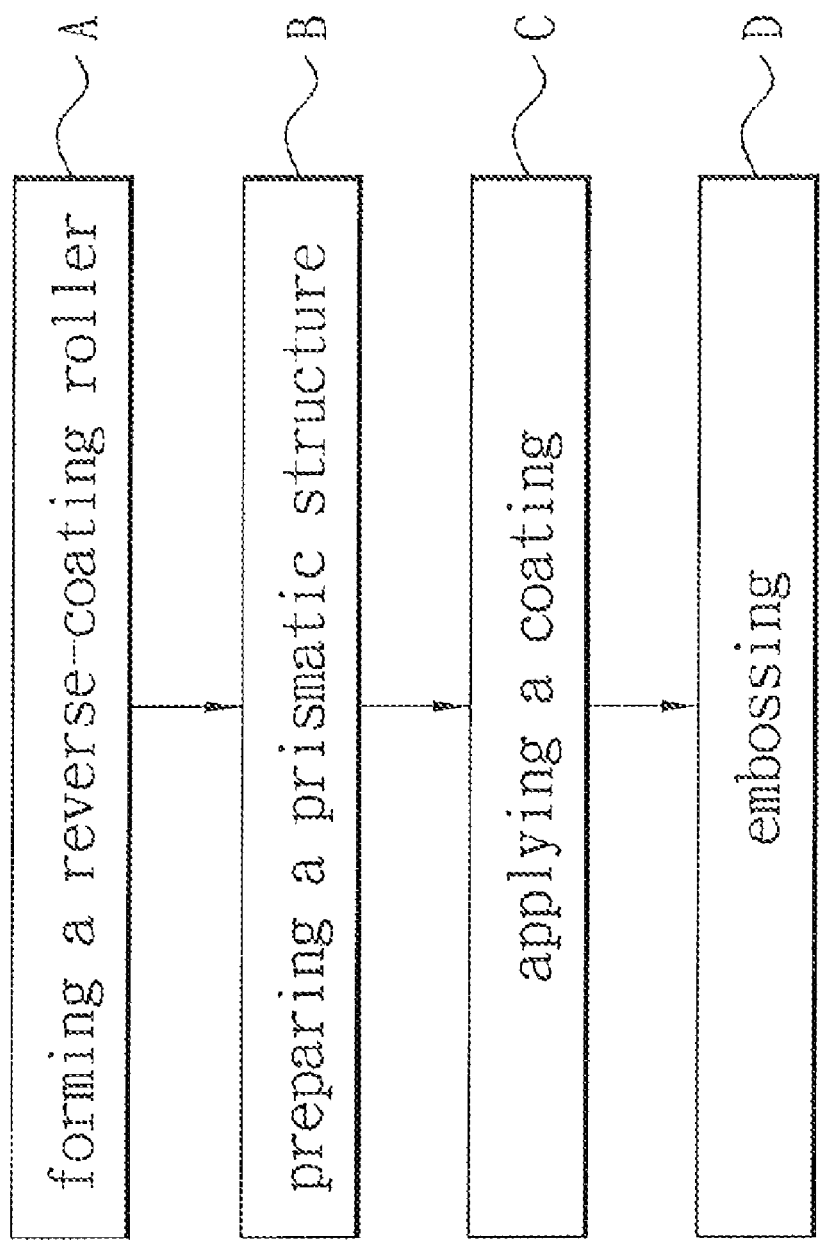
FIG. 5 is a flow diagram of a preferred embodiment of a method for making a prismatic laminate according to the present invention.

Referring to FIG. 5, the preferred embodiment of a method for making the prismatic laminate 3 according to the present invention includes the steps of:

A) Forming a Back-Coating Roller:

A back-coating roller is formed, which has a roller surface with a plurality of recesses arranged in a predetermined pattern. The recesses are produced by laser holography. Specifically, a pattern to be formed on a mask is determined using Fourier analysis. The mask having the pattern is produced using laser holography. The back-coating roller is formed by lithography via the mask so as to form a plurality of recesses, which are arranged in a pattern corresponding to that formed on the mask, on the roller surface of the back-coating roller.

Preferably, a protective layer is applied on the back-coating roller by plating on the roller surface to protect the surfaces of the recesses so as to increase abrasion resistance of the surfaces of the recesses. At the same time, the uniformity of the recesses can be improved by virtue of the protective layer so as to precisely control the uniformity of the microstructures 322 to be formed on the optical layer 32.

B) Preparing a Prismatic Structure:

A prismatic structure is prepared, which includes a plate body having a first surface and a second surface opposite to the first surface, and a plurality of prismatic strips formed on the first surface of the plate body.

C) Applying a Coating:

A coating containing a resin component and an antistatic agent is applied on the second surface of the plate body in a roll-to-roll manner. The resin component used in the preferred embodiment is an ultra-violet curable resin including an ultra-violet curable monomer and an ultra-violet curable oligomer, and a photo-initiator.

D) Embossing:

The coating is embossed with the back-coating roller while being cured by an ultra-violet irradiation to form an optical layer including a plurality of microstructures protruding in a direction away from the second surface of the plate body and having a pattern corresponding to that of the recesses in the roller surface.

Since the back-coating roller having uniform and precise recesses can be formed via laser holography and lithography, the microstructures 322 of the optical layer 32 formed thereby can be controlled precisely to have a uniform protruding height ranging from 0.05 µm to 0.5 µm. Therefore, satisfactory haze and transmittance can be obtained for the optical layer 32.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

We claim:

1. A method for making a prismatic laminate, comprising the steps of:
   a) forming a back-coating roller having a roller surface with a plurality of recesses arranged in a predetermined pattern and produced by laser holography;
   b) preparing a prismatic structure including a plate body having a first surface and a second surface opposite to the first surface, and a plurality of prismatic strips formed on the first surface of the plate body;
   c) applying a coating containing a resin component and an antistatic agent on the second surface of the plate body; and
   d) embossing the coating with the back-coating roller to form an optical layer including a plurality of microstructures protruding in a direction away from the second surface of the plate body and having a pattern corresponding to that of the recesses in the roller surface.

2. The method as claimed in claim 1, wherein the resin component includes a thermoplastic resin.

3. The method as claimed in claim 1, further comprising a step of applying a protective layer on the roller surface to protect the surfaces of the recesses after the step a).

4. The method as claimed in claim 3, wherein the step of applying the protective layer is conducted by plating.

5. The method as claimed in claim 1, wherein the resin component includes an ultra-violet curable resin selected from the group consisting of an ultra-violet curable monomer and an ultra-violet curable oligomer, and a photo-initiator.

6. The method as claimed in claim 5, wherein the coating is cured by an ultra-violet irradiation while being embossed by the back-coating roller in the step d).

7. A prismatic laminate comprising:
   a prismatic structure including a plate body having a first surface and a second surface opposite to said first surface, and a plurality of prismatic strips formed on said first surface of said plate body; and
   an optical layer formed on said second surface of said plate body, and including a plurality of microstructures protruding in a direction away from said second surface of said plate body and each having a protruding height ranging from 0.05 µm to 0.5 µm,
   wherein said optical layer is formed from a coating including a resin component and an antistatic agent, and
   wherein said antistatic agent is selected from the group consisting of a metallic conductive particle, metal oxide, and a quarternary ammonium salt.

8. The prismatic laminate as claimed in claim 7, wherein said optical layer has a surface resistance ranging from $10^{10}$ to $10^{13}$ ohms per square.

9. The prismatic laminate as claimed in claim 7, wherein said resin component includes an ultra-violet curable resin selected from the group consisting of an ultra-violet curable monomer and an ultra-violet curable oligomer, and a photo-initiator.

10. The prismatic laminate as claimed in claim 7, wherein said resin component includes a thermoplastic resin.

* * * * *